Patented June 9, 1953

2,641,566

UNITED STATES PATENT OFFICE 2,641,566

RECOVERY OF HYDROCARBONS

Claude E. ZoBell, La Jolla, Calif., assignor to Texaco Development Corporation, New York, N. Y., a corporation of Delaware No Drawing. Application May 15, 1948, Serial No. 27,363

5 Claims. (Cl. 195—3)

This invention relates to the treatment and recovery of hydrocarbons, bituminous substances, and the like in underground deposits, shales and similar formations.

The recovery and improvement of oil or so-called kerogen, supposedly a complex bituminous mixture from shale, is a major problem of long standing because of the close association of the kerogen with the inorganic mineral aggregate and the necessity of handling such large quantities of the latter. Processes such as destructive distillation, solvent extraction at high temperatures and high pressures, and hydrogenation at high temperatures and pressures in the presence of a catalyst have been practiced to some extent but are generally regarded as unsatisfactory because of the relatively low yields obtained and the large quantities of aggregate that must be handled and brought up to the required high temperatures. In some cases the mineral aggregate may run as high as 75% or more.

A similar problem is encountered in the so-called secondary recovery of the more viscous petroleum oils in underground deposits wherein the oil is intimately associated with mineral aggregate including rock and sand. Even in cases where the oil is relatively free of the aggregate, it cannot be pumped to the surface because of its relatively high viscosity.

One object of the invention is the provision of a novel process of treating hydrocarbons, bituminous materials, and like substances, normally held in close association with an inorganic mineral aggregate, so that they can be separated therefrom and recovered.

Another object of the invention is the provision of a novel process wherein oil shale can be hydrogenated at a relatively low temperature to effect both recovery of the oil contained therein and improvement of the properties of that oil.

Other objects and advantages of the invention will appear from the following description and claims.

In brief, the present invention may be said to involve the processing of hydrocarbons such as petroleum oils, and bituminous mixtures such as shale oils and the like, wherein the viscosities of the oils are apparently reduced or their characteristics otherwise altered so that the converted oils and their products of alteration can be recovered from retaining inorganic aggregate such as that of oil sands or shale, and, if, underground, be transferred to the surface and recovered. Additionally, the process is carried out at relatively low or atmospheric temperatures by hydrogenation in the presence of microbiological or enzymatic catalysts whereby the properties of the recovered oils are improved.

A suitable microbiological catalyst for the process is hydrogenase, an enzyme produced by a number of different bacteria, which has been found to catalyze the reduction of a number of different substances by molecular hydrogen. While the action of the enzyme is not entirely understood, it is believed to convert molecular hydrogen to a more active form of hydrogen, termed by some "active" or nascent hydrogen, which finds an acceptor in a number of constituents of shale and petroleum oils such as carbon and sulfur.

It is to be understood that another enzyme or catalyst is usually required in addition to the hydrogenase, the other enzyme serving to activate the substrate. The same enzyme complex may perform both functions or two separate entities may be required. In other words, some bacteria which produce hydrogenase also produce enzymes which activate the reducible substrate, but this is not true of all hydrogenase-producing bacteria. Many substrates will react directly with the hydrogen activated by hydrogenase in the absence of a second enzyme or catalyst. Typical of such substrates are certain olefins, diolefins, acetylenes and amines. Nitrate is an example of such an inorganic substrate. However the majority of substrates require another enzyme or catalyst, separate and distinct from hydrogenase to bring about the reaction with active hydrogen produced from hydrogenase. The reduction of carbon dioxide to methane and the reduction of sulfates to sulfides are in this class as is the reduction of sulfur in cyclical sulfur compounds. The sulfur in cysteine (—C—SH) may be reduced to hydrogen sulfide by active hydrogen in the absence of another enzyme or catalyst but cystine (—C—S—C—) is not so reduced under ordinary conditions of temperature, pressure and pH.

"Substrate" may be defined as the substance or compound acted upon, i. e., the substance which accepts hydrogen and is reduced, a substance from which hydrogen may be produced by hydrogen-producing bacteria, or a substance from which hydrogenase may be produced by hydrogenase-producing bacteria.

Hydrogenase is believed to be an iron porphyrinprotein complex which is active only in the reduced or ferrous states.

Hydrogenase is produced by several microbial species and can be used to catalyze the reaction of hydrogen with a number of substances including fumarates, malates, formaldehyde, methyl alcohol, carbon monoxide, carbon dioxide, carbonates, nitrates, sulfates, sulfites, thiosulfates and a number of other compounds, thus enabling the method of this invention to be used in a number of different processes for treating various substances. A preferred hydrogenase for reducing complex sulfur compounds in oil is *Desulfovibrio desulfuricans* or related species although others may be used.

Hydrogenase produced by methane bacteria can be used to catalyze the reaction of molecular hydrogen with carbon monoxide and carbon dioxide. It can also be used to catalyze the reaction of molecular hydrogen with formic acid, formaldehyde, and methyl alcohol, the reactions being believed to be generally as follows:

$$CO + 3H_2 \rightarrow CH_4 + H_2O$$
$$CO_2 + 4H_2 \rightarrow CH_4 + 2H_2O$$
$$HCOOH + 3H_2 \rightarrow CH_4 + 2H_2O$$
$$HCHO + 2H_2 \rightarrow CH_4 + H_2O$$
$$CH_3OH + H_2 \rightarrow CH_4 + H_2O$$

The production of methane by the reduction of carbon dioxide with hydrogen can also be catalyzed by *Methanobacterium omelianskii*, *Methanosarcina methanica*, *Methanosarcina barkerii* and *Methanobacterium formicicum*. The two last mentioned species produce hydrogenase capable of reducing carbon monoxide to methane in the presence of hydrogen. The reduction enabled by the present process is capable of use in still further reactions such as the hydrogenation of carbon dioxide to form formic acid, a suitable catalyst being the hydrogenase produced by *Escherichia coli*. While this reaction is normally reversible, an increase in the partial pressure of the carbon dioxide appears to cause the reaction to proceed to completion. The yield may be increased by raising the partial pressure of the hydrogen. The reaction is believed to be generally as follows:

$$CO_2 + H_2 \rightarrow HCOOH$$

In the presence of hydrogen, hydrogenase and other enzymes or catalysts produced by the following microorganisms may be used to effect the reactions indicated:

*Clostridium aceticum* and *Clostridium thermoaceticum*.—

$$2CO_2 + 4H_2O \longrightarrow CH_3COOH + 2H_2O$$
(Acetic acid)

*Butyribacterium rettgeri*.—

$$2CH_3COOH + 2H_2 \longrightarrow CH_3CH_2CH_2COOH + 2H_2O$$
(butyric acid)

*Hydrogenomonas pantotropha*.—

$$CO_2 + 2H_2 \longrightarrow (HCHO) \longrightarrow \text{carbohydrates, etc.} + H_2O$$

*Escherichia formica*.—Reduction of fumarate and methylene blue by molecular hydrogen.

*Proteus vulgaris*.—Hydrogenation of fumarate, maleate, malate, carbonates and oxygen.

*Clostridium sporogenes*.—Catalyzes hydrogenation of a number of organic compounds including acetaldehyde, acetic acid, acetyl methyl carbinol, acrolein, arginine, aspartic acid, cysteine, cystine, diacetyl, glutaric acid, glyceric aldehyde, glycine, glyoxal, hydroxylamine, malonic acid, methionine, ornithine, oxalic acid, proline, tryptophane and tyrosine.

*Clostridium welchii*, *Bacillus hydrogenes*, *Hydrogenomonas minor*, *Escherichia formica* and *Escherichia coli* catalyze hydrogenation of nitrates, nitrites, or other reducible nitrogen compounds:

$$HNO_3 + 4H_2 \rightarrow NH_4OH + 2H_2O$$
$$HNO_2 + 3H_2 \rightarrow NH_4OH + H_2O$$
$$NH_2OH + H_2 \rightarrow NH_4OH$$

Certain species of *Desulfovibrio*, *Sporovibrio*, and other sulfate reducers catalyze reduction of sulfates by hydrogen:

$$\overset{=}{SO_4} + 4H_2 \longrightarrow \overset{=}{S} + 4H_2O$$

Some species also catalyze reduction of sulfites and thiosulfates to hydrogen sulfide.

Catalysts for the reduction of sulfur-containing compounds can be isolated also from marine sediments, the cultures apparently being best in an aqueous medium of the composition of sea water enriched by:

0.02% calcium lactate
0.02% ascorbic acid
0.02% ferrous ammonium phosphate
0.05% sodium bicarbonate
0.5% potassium sulfate Except when oxygen is being intentionally reacted with hydrogen, it is desired that only anaerobic species be used to avoid the presence of oxygen and consequent undesired consumption of hydrogen.

Deuterium or heavy hydrogen ($D_2$) can be substituted for hydrogen in some reducing reactions, for example, *Escherichia coli* is capable of catalyzing the reaction of hydrogen with fumaric acid to form dideuterosuccinic acid.

$$HOOC-\overset{H}{\underset{}{C}}=\overset{H}{\underset{}{C}}-COOH + D_2 \longrightarrow HOOC-\overset{H}{\underset{D}{C}}-\overset{H}{\underset{D}{C}}-COOH$$

Some other examples of reactions are:

$$CO_2 + 4D_2 \rightarrow CD_4 + 2D_2O$$
$$CO_2 + D_2 \rightarrow DCOOD$$

Thus the present method provides a relatively simple and inexpensive process for the manufacturing of special chemicals wherein deuterium is employed.

Kerogen, found in shales, is considered to be formed, primarily, of complex bituminous substances. It contains hydrocarbons, phenols, labile bituminous materials, sulfur and nitrogen complex compounds. In the presence of a catalyst such as hydrogenase, other enzymes or catalysts usually being required, hydrogen combines with such compounds to reduce the phenols, react with any labile materials, remove the nitrogen and sulfur, reduce the overall viscosity of the oil and in general, convert the original substantially heavy oil to lighter oil of more desirable characteristics. The gaseous products produced may include some hydrocarbons, such as methane, hydrogen sulfide and ammonia. These reactions also take place with other hydrocarbons such as the petroleum oils found in underground deposits, the principal advantage of the process in that connection being the separation of the oil from the oil sand or other aggregate and apparent reduction of viscosity of the oil so that the oil can be transferred to the surface as by pumping.

One application of the invention can be explained in connection with the processing of oil shales which are notoriously difficult and expensive to process and secure a reasonable hydrocarbon yield therefrom. The shale is first ground, preferably to relatively fine particle size, and placed in a suitable receptacle. Preferably, the latter is substantially gas tight. Such substantial sealing of the receptacle is preferred in order that any oxygen-containing gases can be excluded therefrom since the hydrogen in the presence of a catalyst such as hydrogenase finds a ready acceptor in oxygen and is lost as water as far as the oil shale is concerned. Preferably, the upper portion of the receptacle in which the gaseous reaction products are collected and removed is blanketed with hydrogen or some relatively inert gas before the actual processing is begun.

The shale particles in the receptacle are covered with a nutrient medium, principally water, containing either the enzyme hydrogenase or hydrogenase-producing microorganisms, another enzyme or catalyst usually being required. One specific type of such microorganism such as *Clostridium sporogenes*, previously described, can be used to limit the reaction to only one constituent of the shale of the shale oil or a mixture of such organisms can be used to effect the reaction of a plurality of constituents. Various types of hydogenase capable of catalyzing the hydrogenation of different substances have already been discussed. It is to be understood that such organisms may be used singly or in combination, it also being understood that when some combinations are attempted, one type of organisms may eventually become much more active than another and substantially eliminate the effect of the second, a phenomenon well known to microbiologists.

The type of nutrient medium employed will vary with the type or types of microorganisms being handled as is well known in the microbiological art. A mineral-salt type medium is usually used, the above described medium being typical.

The nutrient medium is charged with either hydrogenase or hydrogenase-producing bacteria and another enzyme or enzymes or the bacteria producing them and the temperature, pressure and pH maintained in ranges most conducive to the catalytic action of the microorganisms including the product enzymes thereof. Preferably the temperature is maintained in the range of 20° to 75° C., depending upon the types of microorganisms being used, the pressure at substantial atmospheric or relatively low pressures, and the pH in the range of 6.5 to 7.5. Optimum temperatures may be raised appreciably by hydrostatic pressure. The total pressure can be varied from atmospheric to high pressure in the order of 300 atmospheres. Preferably, the pressure, because of engineering and economic considerations, is kept below 10 atmospheres.

Molecular hydrogen is then charged to the receptacle in a manner whereby it is uniformly distributed throughout the nutrient medium and the shale. Means is preferably employed to keep the slurry agitated, thus avoiding settling of the shale and insuring contact of the hydrogen and the enzyme with all the shale particles. Such agitation can be secured by proper distribution of the hydrogen charged to the receptacle.

The hydrogen is apparently converted to a more active form by action of the hydrogenase and reacts with the so-called kerogen or complex bituminous material in the shale to apparently reduce its viscosity and effect its disengagement from the solid aggregate. At the same time, the characteristics of the kerogen are improved in that sulfur is removed and the labile compounds are hydrogenated. Some of the material is exhaustively hydrogenated in some cases to methane. The resultant gaseous products including methane, hydrogen sulfide, and ammonia are collected at the top of the receptacle and withdrawn. Any hydrogen removal in this manner may be recovered and recycled through the shale.

The released oil tends to collect on the surface of the medium and may be withdrawn by a series of valve-controlled take-offs positioned at different levels in the tank. Separation of the oil from the medium is a relatively simple task by reason of the difference in their specific gravities. After recovery of the oil, the residual aggregate is removed from the receptacle and a new charge of shale substituted therefor. Preferably fresh inoculated nutrient is charged with each batch of shale.

If hydrogen is not available or not desirable for use, the nutrient medium may be charged with hydrogen-producing bacteria and a suitable substrate from which hydrogen for use in the process can be produced directly in the nutrient medium. Polyhdric compounds such as glycerol, sugar, starch and cellulose, are especially good substrates. From an economical point of view, cheaper materials such as agricultural wastes, offal, etc. are preferred.

This alternate procedure has an advantage in that the receptacle containing the shale can be charged with the several types of bacteria and the process carried out with a minimum of attention Some substrates from which hydrogen can be produced by different bacteria are listed in the following table:

| Substrate | Microorganism |
|---|---|
| Glucose | Aerobacter aerogenes. Aerobacter cloacae. Bacillus acetoethylicus. Bacillus polymyxa. Clostridium acetobutylicum. Clostridium butylicum. Clostridium butyricum. Clostridium botulinum. Clostridium oedematis-maligni. Clostridium sporogenes. Clostridium tetani. Clostridium tetanomorphum. Clostridium thermosaccharolyticum. Clostridium welchii. Escherichia coli. Proteus mirabilis. Proteus vulgaris. Sarcina maxima. Sarcina ventriculata. Serratia marcescens. Algae such as Scenedesmus. |
| Cellulose | Bacillus polymyxa. Clostridium hydrogenicus. Clostridium celluloslytique. Clostridium cellulosolvens. Clostridium dissolvens. Clostridium fossicularum. Clostridium werni. |
| Glycerol | Aerobacter aerogenes. Clostridium butylicum. Clostridium sporogenes. Clostridium tetanomorphum. |
| Mannitol | Aerobacter aerogenes. Escherichia coli. |
| Acetic acid | Aerobacter indologenes. |
| Citric acid | Do. |
| Succinic acid | Do. |
| Amygdalin | Clostridium acetobutylicum. Clostridium butylicum. Clostridium butyricum. |
| Cellobiose | Clostridium acetobutylicum. Clostridium butylicum. Clostridium butyricum. |
| Galactose | Clostridium acetobutylicum. Clostridium butyricum. |
| Fructose | Clostridium acetobutylicum. Clostridium butyricum. Clostridium botulinum. Clostridium oedematis-maligni. Escherichia coli. Sarcina maxima. Sarcina ventriculata. |
| Lactose | Clostridium acetobutylicum. Clostridium butyricum. Clostridium sporogenes. Clostridium welchii. |
| Maltose | Clostridium acetobutylicum. Clostridium butylicum. Clostridium butyricum. Clostridium botulinum. Clostridium oedematis-maligni. Clostridium tetanomorphum. Escherichia coli. |

| Substrate | Microorganism |
|---|---|
| Mannose | Clostridium acetobutylicum.<br>Clostridium butyricum.<br>Clostridium botulinum.<br>Clostridium oedematis-maligni.<br>Escherichia coli. |
| Salicin | Clostridium acetobutylicum.<br>Clostridium butyricum.<br>Clostridium botulinum.<br>Clostridium oedematis-maligni.<br>Clostridium sporogenes.<br>Escherichia coli. |
| Sucrose | Clostridium acetobutylicum.<br>Clostridium butylicum.<br>Clostridium butyricum.<br>Clostridium botulinum.<br>Clostridium oedematis-maligni.<br>Clostridium sporogenes.<br>Escherichia coli. |
| Arabinose | Clostridium acetobutylicum.<br>Clostridium butylicum.<br>Clostridium butyricum.<br>Escherichia coli. |
| Gluconic acid | Clostridium acetobutylicum. |
| Mannitol | Do. |
| Aesculin | Clostridium butylicum. |
| Dextrin | Do. |
| Dimethyl glucoside | Do. |
| Inositol | Do. |
| Inulin | Clostridium butylicum.<br>Clostridium sporogenes. |
| Melibiose | Clostridium butylicum. |
| Raffinose | Clostridium butylicum.<br>Pseudomonas rathonis. |
| Rhamnose | Clostridium butylicum. |
| Starch | Clostridium butylicum.<br>Clostridium sporogenes.<br>Algae such as Scenedesmus. |
| Pyruvic acid | Clostridium butylicum.<br>Clostridium butyricum.<br>Clostridium botulinum.<br>Clostridium tetanomorphum. |
| Trehalose | Clostridium butylicum. |
| Xylose | Clostridium butylicum.<br>Clostridium thermosaccharolyticum.<br>Clostridium butyricum. |
| Acetic acid | Clostridium butyricum. |
| Butyric acid | Do. |
| Lactic acid | Do. |
| Valeric acid | Do. |
| Pectin | Do. |
| Peptone | Clostridium botulinum.<br>Clostridium sporogenes. |
| Sorbitol | Clostridium oedematis-maligni.<br>Escherichia coli. |
| Aspartic acid | Clostridium tetani.<br>Clostridium teanomorphum. |
| Glutamic acid | Clostridium tetani.<br>Clostridium tetanomorphum. |
| Serine | Clostridium tetani.<br>Clostridium tetanomorphum. |
| Cystine | Clostridium tetanomorphum.<br>Proteus vulgaris. |
| Fumaric acid | Clostridium tetanomorphum. |
| Methionine | Do. |
| Histidine | Do. |
| Malic acid | Do. |
| Tyrosine | Do. |
| Galactose | Escherichia coli. |
| Formic acid | Do. |
| Glycolic acid | Escherichia coli.<br>Salmonella enteritidis. |

The gases, oils or hydrocarbons produced may be subsequently processed and refined as desired in accordance with recognized petroleum refining and synthetic hydrocarbon manufacturing practices.

While the foregoing example is concerned with shale, it is to be understood that the process is applicable also to the treatment of underground oils that may be bound in aggregate such as the aggregate of oil sands or the like and be incapable of recovery as by pumping. Such methods of recovery, usually termed secondary-recovery, can be broadly considered as the recovery of oil, gas or oil and gas by any method involving artificial flowing or pumping through the joint use of two or more well bores. Water flooding, one of such secondary-recovery operations, involves the introduction of water into an oil formation for the purpose of increasing the oil recovery.

It is considered that the oil, incapable of primary recovery as by artificial or natural flow, is held within the aggregate in the pores thereof by capillary forces and adsorbed on the surface of the grains, such as are found in oil sand, as a film. A typical water flow accomplishes its result by actual displacement, i. e., the forcing of the oil ahead of the water toward a producing well. Ordinarily, the practice comprises the application of water under pressure to the oil bearing formation by means of water intake wells so located that the bank of oil, which is ahead of the advancing water as the latter permeates the aggregate, is forced toward producing wells. The arrangements of the intake wells and the producing wells vary widely in accordance with the formations being processed. A typical arrangement is the so-called 5-spot arrangement in which each producing well is located at the center of a square and is surrounded by 4 intake wells at the corners of the square. An alternative is the so-called 7-spot in which each producing well is located at the center of a hexagon and is surrounded by 6 intake wells at the corners. An excellent discussion of water flooding and the customary practices followed therein will be found in "Secondary Recovery of Oil in the United States," published by American Petroleum Institute, 50 West 50th Street, New York, N. Y., in 1942. Reference is made thereto for further explanation of the various methods that have been practiced.

One of the factors which effect the efficiency of such flooding is viscosity. Oils of relatively high viscosity are difficult to flood satisfactorily. In the application of the process of this invention to water flooding and like operations, the problem of viscosity is considerably reduced since the reactions of hydrogen in its more active form in the presence of hydrogenase tends to decrease the viscosity of the oil.

In practicing the invention in connection with water flooding, the water to be charged to the water intake wells is preferably utilized as the nutrient medium, the general composition thereof being varied in accordance with the microorganisms to be charged. The compositions of such mediums are well known to the art. The water is also charged or inoculated with hydrogenase-containing bacteria and hydrogen-producing bacteria in combination with a suitable substrate, and other enzymes or bacteria producing the same that may be required to activate the various substrates encountered. If the water originally contains bacteria or other microorganisms that may be harmful in the processing, it may be sterilized before the nutrient constituents and microorganisms are added.

When the resultant composition is charged through the water intake wells, not only is the expected flooding achieved, but also a marked decrease in the viscosity of the oil and a release of the oil from its association with the oil sand or other aggregate. The oil which is then displaced by means of its lowered viscosity and by bacterial or enzymatic action is pushed along with the water and eventually separated therefrom at the producing well. It will be understood that the action of the hydrogen in the presence of the hydrogenase is substantially the same as already described as in connection with the treatment of oil shale.

It is to be understood that optimum conditions for the metabolism of the charged bacteria or the catalytic action of the enzymes cannot always be maintained underground by reason of the various temperatures encountered and certain formations such as limestone which may tend to change the pH of the nutrient. The various pressures encountered are not considered to be limiting factors, inasmuch as the bacterial action apparently continues despite the radical changes in the pressure. Proper tests will usually determine the presence or absence of any formation that may alter the pH radically and the initial composition of the water medium determined accordingly.

The amount of oil thus recovered by waterflooding is increased. Any increase in such recovery is a material advantage particularly in view of the present-day shortage of oil. This process admits of the recovery of large quantities of oil hitherto considered not recoverable. One such reserve is found in the Athabaska sands of Northern Alberta, Canada, wherein it is estimated that the oil bearing sands cover an area of from 10,000 to 30,000 square miles and constitute the largest known deposit of oil in the world. While the total reserve in this field is estimated to be 100 million barrels, only about 1% is recoverable with present-day methods.

The term "microorganisms" as used herein is intended to include bacteria, their enzymes and other products as well as related fungi and molds.

Obviously, many modifications and variations of the invention as hereinabove set forth may be made without departing from the spirit and scope thereof and therefore only such limitations should be imposed as are indicated in the appended claims.

I claim:

1. A method of treating hydrocarbons and bituminous materials such as those encountered in combination with inorganic aggregate underground deposits and shales and similar formations for the purpose of facilitating separation and recovery of such substances which comprises the steps of contacting said substances with a substantial quantity of oxygen-free hydrogen in the presence of hydrogenase-producing microorganisms selected from the group consisting of *Desulfovibrio desulfuricans* and *Sporovibrio*, effecting said contact in the presence of a microbiological nutrient medium and removing the resulting products.

2. A method according to claim 1 in which said hydrogen is generated by the action of *Clostridium* microorganisms on carbohydrates.

3. A method of effecting the separation and recovery of hydrocarbons from oil shale which comprises the steps of immersing said shale in the microbiological nutrient medium, charging said mixture of shale and nutrient medium with a substantial amount of oxygen-free hydrogen and with hydrogenase-producing microorganisms selected from the group consisting of *Desulfovibrio desulfuricans* and *Sporovibrio*, and separating the resulting products.

4. A method according to claim 3 in which said shale is reduced to relatively fine particles prior to its contact with hydrogen.

5. A method according to claim 3 in which said hydrogen is generated by the action of *Clostridium* microorganisms on carbohydrates.

CLAUDE E. ZoBELL.

References Cited in the file of this patent

UNITED STATES PATENTS

| Number | Name | Date |
|---|---|---|
| 1,835,998 | Giron | Dec. 8, 1931 |
| 2,396,900 | Taggart | Mar. 19, 1946 |
| 2,413,278 | ZoBell | Dec. 24, 1946 |

OTHER REFERENCES

ZoBell, World Oil, August 25, 1947, pp. 36, 39, 40, 42, 44 and 47. September 1, 1947, pp. 35–38, 40, and 41.

Annual Review of Biochemistry, vol. 16, 1947, pp. 579, 580, 584–586.